Patented May 19, 1936

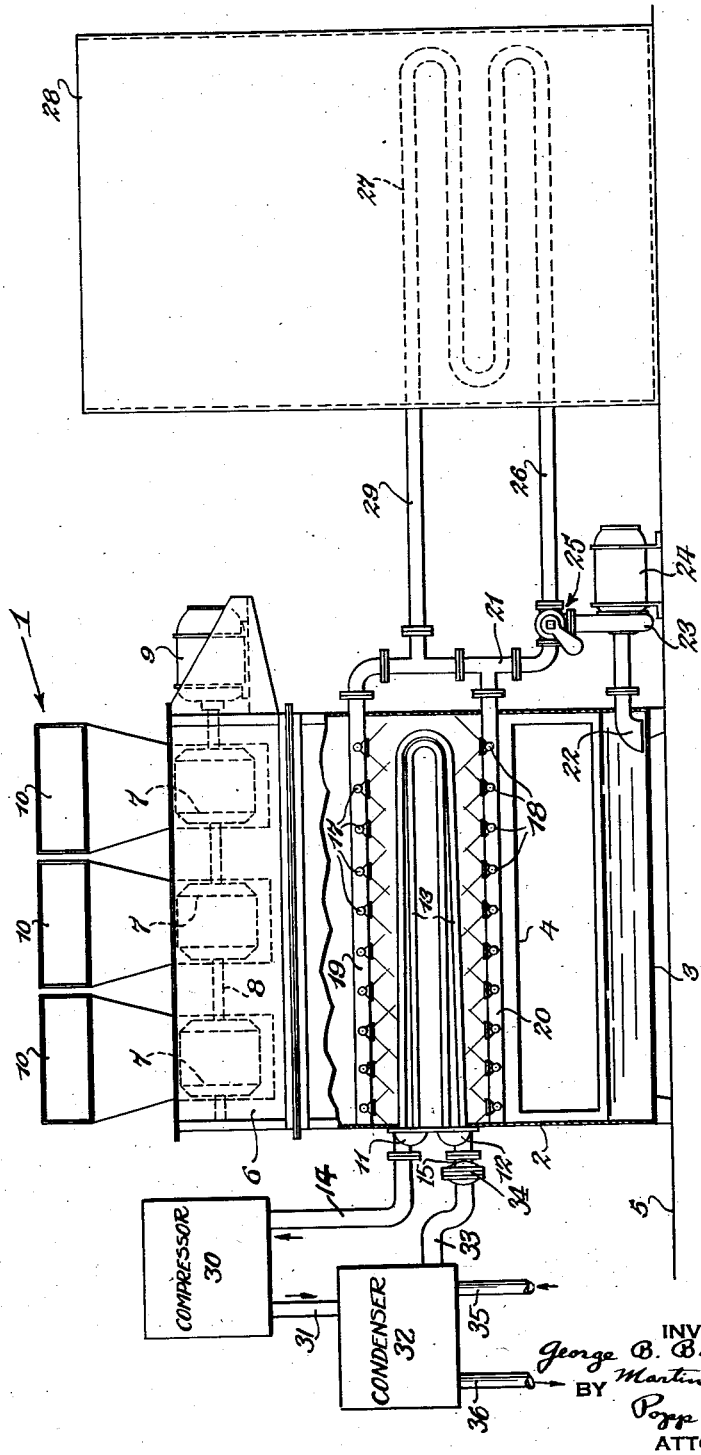

2,040,828

UNITED STATES PATENT OFFICE 2,040,828

COOLER

George B. Bright, Detroit, Mich., and Martin H. Olstad, Bayside, N. Y., assignors to Niagara Blower Company, Buffalo, N. Y., a corporation of New York Application December 26, 1933, Serial No. 703,882

12 Claims. (Cl. 257—67)

This invention relates to an industrial cooler and more particularly to a cooler for maintaining the proper low temperature of materials as well as maintaining the proper low temperature and proper relative humidity of the atmosphere in the room containing the materials either during or after their processing. More specifically, the invention relates to a cooler which is adapted for use with fermenting processes or in dairies or other industries where it is desirable to cool the materials and the air in the room itself and to maintain a desired relative humidity in the room. In a fermenting room the wort is contained in fermenting tanks and to secure the proper fermentation it is desirable to prevent the temperature of the wort from rising above predetermined limits. At the same time it is desirable to cool the air in the fermenting room and to maintain an accurate relative humidity. In the milk rooms of dairies the milk is cooled and after it is cooled it is desirable to store the milk in a room having a cool atmosphere and a predetermined relative humidity. However, the present invention has much wider application than the instances named and can be used anywhere where it is desirable to cool both air and liquid materials or to obtain a desired relative humidity in a room and at the same time cool materials.

Heretofore in such processing it has been the practice to provide independent units for cooling the air and the materials, one being, of course, an air refrigerating unit to cool and maintain the desired relative humidity of the air and the other being a separate refrigerating unit to cool the materials. It is one object of the present invention to provide a single cooling system which will function for both purposes and thereby eliminate a duplication of equipment. For this purpose a cooler is employed in which the air to be cooled and/or conditioned is passed around coils in which ammonia or the like can be directly expanded and in which water or brine is sprayed directly against these pipes so as to increase the efficiency of the heat transfer from the air stream and also to obtain the desired relative humidity in the air stream. This spray water is, of course, chilled by contact with the cooling pipes and the present invention proposes to withdraw all or a part of this spray water from the bottom of the tank and to pass it through coils which cool the fermenting wort, milk or the like. The present invention also proposes by-pass means which permit any desired quantity of the withdrawn spray water to pass through the coils or recirculate through a by-pass directly back to the spray nozzles so that the spray cooler, as described, can also be used so that its fully capacity can be utilized in cooling either the spray water or the air. The invention therefore provides a very flexible cooler which can be readily adapted to many industrial cooling uses and which is susceptible of accurate control and regulation as the processing conditions may require.

Another important object of the present invention is to provide a cooling system in which brine or a like liquid is directly sprayed or passed over refrigerant expansion coils exposed to the atmosphere, the brine being then collected and used in a heat interchanger to cool foodstuffs such as milk. By so spraying the brine directly over expansion coils the heat transfer is extremely rapid, large volumes of brine can be cooled so as to provide a large capacity in absorbing sudden loads and there is no difficulty in ice forming even though the refrigerant is at a lower temperature than the freezing point of the brine used.

In the accompanying drawing is a diagrammatic representation of a brine spray cooler which illustrates the manner in which the invention can be employed in the fermenting industries. The cooler, indicated generally at 1, is preferably made in accordance with my co-pending application, Ser. No. 687,032, filed August 28, 1933, to which reference is made for a more detailed description of its construction and operation. In general the cooler comprises an upright rectangular spray casing 2 having a bottom 3 and an open upper end. This casing and the other parts of the cooler are preferably made of aluminum throughout so that if brine is employed as the spray medium the casing and other parts do not deteriorate. This casing 2 has an air inlet 4 at its lower end through which air from the room 5 is drawn into the casing. To the upper side of this casing is secured a fan housing 6 carrying a plurality of fans 7 on a fan shaft 8, this fan shaft being driven by a motor 9. Each of the fans is arranged in the usual manner to draw air from the spray chamber 2 and discharge it through outlets 10 into the room. Mounted in one side of the spray chamber casing 2 are a pair of headers 11 and 12 which are connected by a plurality of hairpin tubes 13, these tubes being arranged within the spray chamber 2. Ammonia or other suitable refrigerant medium is admitted, expanded and withdrawn from the heads 11 and 12 by means of pipe connections 14 and 15.

For this purpose a conventional compressor and condenser is illustrated, the compressor being indicated at 30 and drawing the expanded ammonia or the like from the header 11 by means of the pipe connection 14 and forcing the compressed ammonia through the pipe 31 to the condenser 32 where it is cooled and discharged through a pipe 33 and expansion valve 34 into the pipe connection 15 and other header 12. The cooling water inlet pipe to the condenser 32 is illustrated at 35 and the cooling water outlet pipe at 36, it being an essential feature of this invention that the cooling of the condenser 32 is independent of the rest of the apparatus.

In order to increase the heat transfer between the hairpin tubes 13 and the air stream drawn through the spray chamber by the fans 7, brine is sprayed against the upper and lower sides of the hairpin tubes 13 from a plurality of upper and lower brine spray nozzles 17 and 18. A more detailed description of the action of the brine sprays is set forth in my said co-pending application. The brine spray nozzles 17 and 18 are carried by upper and lower brine pipes 19 and 20 and brine is supplied to these pipes from a brine inlet pipe. The brine collects in the bottom of the spray chamber 2 and is withdrawn through the pump suction 22 of a pump 23 which is driven by an electric motor 24. The outlet from the pump 23 connects with the inlet of a three-way valve 25 by means of which the brine can either be directed to the pipe 21 or to a pipe 26 connecting with attemperator coils 27 in a fermenting vat or tank 28. The return pipe 29 from the coils 27 connects with the brine inlet line 21 of the spray nozzles 17 and 18.

The vats or tanks 28 contain the fermenting wort and the purpose of the attemperator coils is to cool the wort and absorb the excess heat caused by fermenting and prevent the beer from becoming too warm. Since the cooler 1 is located in the same room as the fermenting vats or tanks the atmosphere surrounding the tanks is also cooled and the desired relative humidity can be maintained, the room temperature being maintained at approximately 40° F. In operation the three-way valve 25 is set to allow the pump 23 to discharge, in part or in whole, as required by the fermenting operation through the attemperator coils 27 in various vats 28 and thence back through the sprays 17 and 18 where it is chilled by the ammonia refrigerator coils 13 and is again picked up by the suction 22 of the pump 23. At the same time that this cooling brine is being circulated through the attemperator coils the brine spray cooler 1 operates as an air cooler to keep the room cool, thereby effecting a dual service.

It will be noted that the three-way valve 25 controls the amount of cooling done by the attemperator coils in the fermenting tanks 28. Since the temperature of the refrigerant in the hairpin tubes 13 is presumed to be practically constant, the resultant temperature of the liquid handled by the pump 23 will always be at approximately the same temperature, this being correct for the cooling requirements. Thus, the brine spray cooler 1 will perform the dual function of keeping the room cool and keeping the spray water pumped to the attemperating coils cool in an entirely satisfactory manner and avoid separating the cooling system for the attemperating coils and the air cooling system.

As applied to dairies the service is somewhat different, the milk being pre-cooled in either a Boudelot type of cooler through which the cold spray water from the pump 23 is forced and the milk run over the exterior of the tubes of the cooler, and thus cooled, or the milk may be cooled in what is known as a two pipe cooler in which the milk is passed through one pipe and the chilled spray water from the pump 23 to another concentric pipe. If the operation of cooling the milk has been completed the three-way valve 25 is set to discharge entirely through pipe 21 and the spray nozzles. The fans on the brine spray cooler are then started and the full capacity of the cooler utilized to maintain the milk storage room at the desired temperature.

It is obvious, of course, that in accordance with temperature requirements, brine, water or other non-freezing liquid can be employed as the spray water handled by the pump 23.

From the foregoing it is apparent that the present invention provides a very simple and efficient cooler in which advantage is taken of the fact that both the air and the spray water are cooled in a spray cooler of the type shown, the spray water being withdrawn from the bottom of the tank and passed through cooling coils for maintaining the processed materials in the room at the desired temperature. However, the invention can also be employed wherever it is desirable to obtain cold or conditioned air and a liquid cooling medium such as brine.

We claim as our invention:

1. A cooler of the character described, comprising a casing maintained substantially at atmospheric pressure, a refrigerant expansion coil in said casing, means for conducting cooled refrigerant to said coil and permitting it to expand therein, means for passing a liquid over the outside of said coil whereby the heat of said liquid is absorbed by said refrigerant, heat interchanging means other than the refrigerant cooling means and means for collecting and passing said liquid, after passing over said coil, through said heat interchanging means to usefully absorb heat.

2. A cooler of the character described, comprising a casing maintained substantially at atmospheric pressure, a refrigerant expansion coil in said casing, means for conducting cooled refrigerant to said coil and permitting it to expand therein, means for passing a liquid over the outside of said coil whereby the heat of said liquid is absorbed by said refrigerant, heat interchanging means other than the refrigerant cooling means, means for collecting and passing said liquid, after passing over said coil, through said heat interchanging means to usefully absorb heat and means for returning said liquid from said heat interchanging means to said means for passing the liquid over said coil to be recooled.

3. A cooler of the character described, comprising a casing maintained substantially at atmospheric pressure, a refrigerant expansion coil in said casing, means for conducting cooled refrigerant to said coil and permitting it to expand therein, means for passing brine over the outside of said coil whereby the heat of said brine is absorbed by said refrigerant, heat interchanging means other than the refrigerant cooling means and means for collecting and passing said brine, after passing over said coil, through said heat interchanging means to usefully absorb heat.

4. A cooler of the character described, comprising a casing, cooling means in said casing, means for supplying a refrigerating medium to said cooling means, means for passing an air stream through said casing, means for passing a liquid over the exterior of said cooling means, heat exchanging means independent of said refrigerating medium supplying means and arranged externally of said casing and means for collecting and passing the liquid, after passing over said cooling means, through said heat interchanging means to usefully absorb heat.

5. A cooler of the character described, comprising a casing, a refrigerant expansion coil in said casing, means for passing an air stream through said casing, means for conducting cooled refrigerant to said coil and permitting it to expand therein, means for passing a liquid over the outside of said coil whereby the heat of said liquid is absorbed by said refrigerant, heat interchanging means other than the refrigerant cooling means and means for collecting and passing said liquid, after passing over said coil, through said heat interchanging means to usefully absorb heat.

6. A cooler of the character described for cooling materials in a room, comprising a casing, a refrigerant expansion coil in said casing, means for passing an air stream through said casing and discharging it into said room, means for conducting cooled refrigerant to said coil and permitting it to expand therein, means for passing a liquid over the outside of said coil whereby the heat of said liquid is absorbed by said refrigerant, heat interchanging means other than the refrigerant cooling means in contact with said materials and means for collecting and passing said liquid, after passing over said coil, through said heat interchanging means to cool the materials in said room.

7. A cooler of the character described, comprising a casing maintained substantially at atmospheric pressure, a refrigerant expansion coil in said casing, means for conducting cooled refrigerant to said coil and permitting it to expand therein, means for passing a liquid over the outside of said coil whereby the heat of said liquid is absorbed by said refrigerant, heat interchanging means other than the refrigerant cooling means, means for collecting and passing said liquid, after passing over said coil, through said heat interchanging means to usefully absorb heat, means for returning said liquid from said heat interchanging means to said means for passing the liquid over said coil to be recooled and means for bypassing said liquid from said collecting means around said heat interchanging means to said means for passing the liquid over said coil to be cooled.

8. A cooler of the character described, comprising a casing maintained substantially at atmospheric pressure, a refrigerant expansion coil in said casing, means for conducting cooled refrigerant to said coil and permitting it to expand therein, means for spraying a liquid over the outside of said coil whereby the heat of said liquid is absorbed by said refrigerant, heat interchanging means other than the refrigerant cooling means and means for collecting and passing said liquid, after being sprayed over said coil, through said heat interchanging means to usefully absorb heat.

9. A cooler of the character described, comprising a casing maintained substantially at atmospheric pressure, a refrigerant expansion coil in said casing, means for conducting cooled refrigerant to said coil and permitting it to expand therein, means for spraying a liquid over the outside of said coil whereby the heat of said liquid is absorbed by said refrigerant, heat interchanging means other than the refrigerant cooling means, means for collecting and passing said liquid, after being sprayed over said coil, through said heat interchanging means to usefully absorb heat and means for returning said liquid from said heat interchanging means to said means for spraying the liquid over said coil to be recooled.

10. A cooler of the character described, comprising a casing maintained substantially at atmospheric pressure, a refrigerant expansion coil in said casing, means for conducting cooled refrigerant to said coil and permitting it to expand therein, means for spraying brine over the outside of said coil whereby the heat of said brine is absorbed by said refrigerant, heat interchanging means other than the refrigerant cooling means, and means for collecting and passing said brine, after being sprayed over said coil, through said heat interchanging means to usefully absorb heat.

11. A cooler of the character described, comprising a casing, cooling means in said casing, means for supplying a refrigerating medium to said cooling means, means for passing an air stream through said casing, means for spraying a liquid over the exterior of said cooling means, heat exchanging means independent of said refrigerating medium supplying means and arranged externally of said casing and means for collecting and passing the liquid, after being sprayed over said cooling means, through said heat interchanging means to usefully absorb heat.

12. A cooler of the character described, comprising a casing maintained substantially at atmospheric pressure, a refrigerant expansion coil in said casing, means for conducting cooled refrigerant to said coil and permitting it to expand therein, means for spraying a liquid over the outside of said coil whereby the heat of said liquid is absorbed by said refrigerant, heat interchanging means other than the refrigerant cooling means, means for collecting and passing said liquid, after being sprayed over said coil, through said heat interchanging means to usefully absorb heat, means for returning said liquid from said heat interchanging means to said means for spraying the liquid over said coil to be recooled and means for bypassing said liquid from said collecting means around said heat interchanging means to said means for spraying the liquid over said coil to be cooled.

GEORGE B. BRIGHT.
MARTIN H. OLSTAD.